(12) United States Patent
Aubertin et al.

(10) Patent No.: US 10,054,200 B2
(45) Date of Patent: Aug. 21, 2018

(54) ASSEMBLY COMPRISING A FIXED SUPPORT, PULLEYS, A BELT AND A BELT TENSIONER

(71) Applicant: HUTCHINSON, Paris (FR)

(72) Inventors: Yannick Aubertin, La Riche (FR); Dimitri Voulgaris, Nouatre (FR)

(73) Assignee: Hutchinson, Paris (FR)

( * ) Notice: Subject to any disclaimer, the term of this patent is extended or adjusted under 35 U.S.C. 154(b) by 70 days.

(21) Appl. No.: 14/894,311

(22) PCT Filed: May 23, 2014

(86) PCT No.: PCT/IB2014/061662
§ 371 (c)(1),
(2) Date: Nov. 25, 2015

(87) PCT Pub. No.: WO2014/191882
PCT Pub. Date: Dec. 4, 2014

(65) Prior Publication Data
US 2016/0091064 A1   Mar. 31, 2016

(30) Foreign Application Priority Data
May 30, 2013   (FR) ..................... 13 54929

(51) Int. Cl.
*F16H 7/14*   (2006.01)
*F16H 7/22*   (2006.01)
(Continued)

(52) U.S. Cl.
CPC .......... *F16H 7/129* (2013.01); *F16H 7/1281* (2013.01); *F16H 7/0848* (2013.01);
(Continued)

(58) Field of Classification Search
CPC .......... F16H 7/1281; F16H 2007/0893; F16H 2007/088; F16H 2007/0806; F16H 7/1263
(Continued)

(56) References Cited

U.S. PATENT DOCUMENTS 2,909,074 A * 10/1959 Scheiterlein .............. F16H 7/14
105/105
3,358,521 A * 12/1967 Browning, Jr. ....... F16H 7/1281
474/133
(Continued)

FOREIGN PATENT DOCUMENTS

FR   2 715 982 A1   8/1995

OTHER PUBLICATIONS

Written Opinion of the International Searching Authority dated Jul. 21, 2014, issued in corresponding International Application No. PCT/IB2014/061662, filed May 23, 2014, 8 pages.
(Continued)

*Primary Examiner* — Henry Y Liu
(74) *Attorney, Agent, or Firm* — Christensen O'Connor Johnson Kindness PLLC

(57) ABSTRACT

An assembly comprising: a fixed support such as an engine block, a plurality of pulleys mounted rotatably on the support a belt mounted on said pulleys a tensioner comprising: a plate a rotary element mounted on the plate via a rotating shaft fixed relative to said plate, the tensioner being capable of turning relative to the support, in a predefined direction of rotation, between an idle position in which the rotary element is separated from the belt and an operating position in which the rotary element is in contact with the belt, it being specified that, in the operating position, the belt exerts a force on the rotary element, the direction of said force tending to rotate the tensioner in said same predefined direction of rotation; at least one stop for preventing the
(Continued)

tensioner from rotating in the predefined direction of rotation beyond the operating position of same, the latter thus being defined by the stop; wherein in order to rotate the tensioner relative to the support between the idle position and the operating position of the tensioner, the assembly comprises: at least one closed port arranged on the plate of the tensioner or on the support at least one means for engaging with the or each closed port, said engaging means being fixed relative to the support when the closed port is located on the plate or fixed relative to the plate when the closed port is located on the support.

12 Claims, 4 Drawing Sheets

(51) Int. Cl.
    *F16H 7/12*         (2006.01)
    *F16H 7/08*         (2006.01)

(52) U.S. Cl.
    CPC ............... *F16H 2007/0846* (2013.01); *F16H 2007/0865* (2013.01); *F16H 2007/0893* (2013.01)

(58) Field of Classification Search
    USPC .................. 474/133, 112, 118, 119, 121
    See application file for complete search history.

(56) References Cited

U.S. PATENT DOCUMENTS

| | | | | |
|---|---|---|---|---|
| 3,623,378 A | * | 11/1971 | Stanford | D06F 58/08 474/109 |
| 3,950,046 A | * | 4/1976 | Lubbersmeyer | F16C 13/006 384/546 |
| 4,500,303 A | * | 2/1985 | Sermersheim | F16H 7/1281 424/117 |
| 4,511,348 A | * | 4/1985 | Witdoek | F16H 7/12 474/109 |
| 4,627,228 A | * | 12/1986 | Wolf | D01H 1/241 474/133 |
| 4,767,383 A | * | 8/1988 | St. John | F16H 7/1281 474/111 |
| 4,803,804 A | * | 2/1989 | Bryant | B65G 23/44 198/813 |
| 4,861,321 A | * | 8/1989 | Siegwart, Jr. | B62M 9/16 474/111 |
| 4,957,471 A | * | 9/1990 | St. John | F16H 7/1281 474/133 |
| 4,969,859 A | * | 11/1990 | Holbrook | F16H 7/1263 474/138 |
| 5,423,723 A | * | 6/1995 | Gardner | F16H 7/1281 474/135 |
| 5,453,057 A | * | 9/1995 | Gardner | F16H 7/1281 474/135 |
| 5,489,243 A | * | 2/1996 | Watanabe | F01L 1/02 123/192.2 |
| 5,752,892 A | * | 5/1998 | Taomo | B27B 17/08 474/112 |
| 5,820,503 A | * | 10/1998 | Bruchner | F16H 7/1281 474/112 |
| 6,398,681 B1 | * | 6/2002 | Wanie | F16H 7/1263 474/101 |
| 6,575,858 B2 | * | 6/2003 | Green | F16H 7/1254 474/133 |
| 6,605,013 B2 | * | 8/2003 | Chambers | F16H 7/1281 474/133 |
| 6,699,149 B1 | * | 3/2004 | White | F16H 7/18 474/118 |
| 6,736,743 B2 | * | 5/2004 | Fletcher | F16H 7/24 254/100 |
| 7,481,206 B1 | * | 1/2009 | Carlson | F02B 33/34 123/559.1 |
| 7,597,639 B2 | * | 10/2009 | Serkh | F16H 7/1218 474/109 |
| 7,824,286 B2 | * | 11/2010 | Schmid | F16H 7/1263 411/546 |
| 8,439,019 B1 | * | 5/2013 | Carlson | F16H 7/20 123/559.1 |
| 8,888,625 B2 | * | 11/2014 | Lehman | F16H 7/1263 474/117 |
| 8,939,857 B2 | * | 1/2015 | Doering | B23D 47/12 474/112 |
| 9,261,171 B2 | * | 2/2016 | Doering | F16H 7/16 |
| 9,458,915 B2 | * | 10/2016 | Benz | F16H 7/12 |
| 2001/0046915 A1 | * | 11/2001 | Green | F16H 7/1254 474/138 |
| 2002/0037783 A1 | * | 3/2002 | Chambers | F16H 7/1281 474/135 |
| 2003/0004023 A1 | * | 1/2003 | Hotta | F02B 67/06 474/101 |
| 2003/0139239 A1 | * | 7/2003 | Fletcher | F16H 7/24 474/118 |
| 2004/0203097 A1 | * | 10/2004 | Yue | C12N 9/1205 435/69.1 |
| 2006/0089223 A1 | * | 4/2006 | Van Vooren | A01D 43/086 474/133 |
| 2006/0217223 A1 | * | 9/2006 | Schmid | F16H 7/1263 474/136 |
| 2012/0190488 A1 | * | 7/2012 | Doering | B23D 47/12 474/112 |

OTHER PUBLICATIONS

International Preliminary Report on Patentability dated Dec. 1, 2015, issued in corresponding International Application No. PCT/IB2014/061662, filed May 23, 2014, 1 page.

International Search Report dated Jul. 21, 2014, issued in corresponding International Application No. PCT/IB2014/061662, filed May 23, 2014, 2 pages.

* cited by examiner

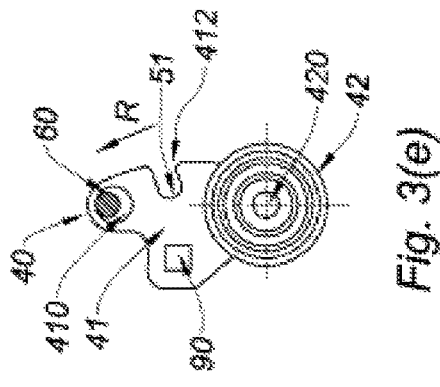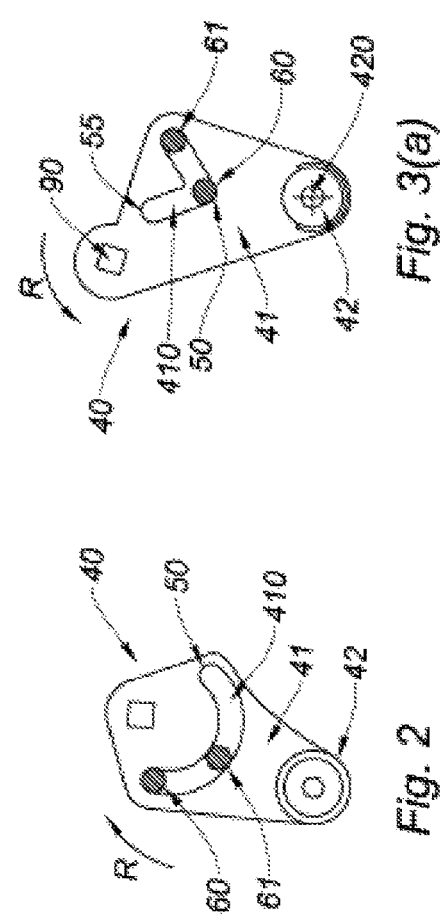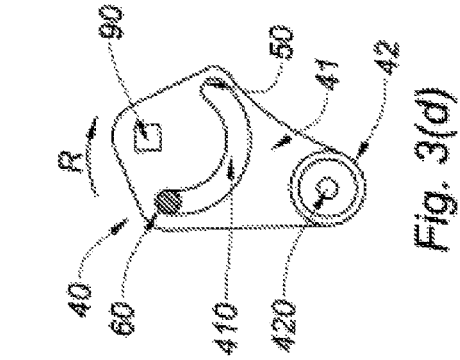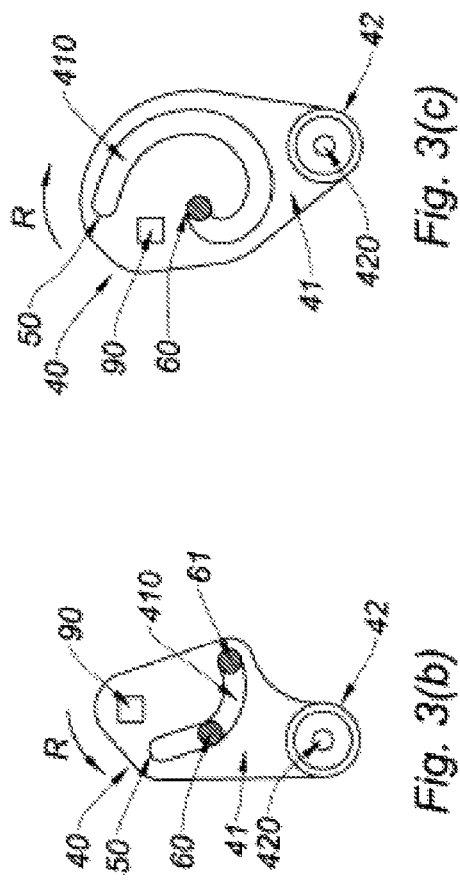

ASSEMBLY COMPRISING A FIXED SUPPORT, PULLEYS, A BELT AND A BELT TENSIONER

FIELD OF THE DISCLOSURE

The present disclosure relates to an assembly including a fixed support such as an engine block, pulleys rotatably mounted on the support, a belt mounted on the pulleys and a belt tensioner.

More particularly, the present disclosure relates to such an assembly in which the tensioner is able to rotate relative to the support, in a predefined rotation direction, between an idle position in which the tensioner is moved away from the belt and an operating position in which the tensioner is in contact with the belt, having specified that, in the operating position, the belt exerts a force on the tensioner, the direction of the force tending to cause the tensioner to rotate in that same predefined rotation direction.

BACKGROUND

In this type of assembly, the tensioner goes from its idle position to its operating position according to the following steps.

In the idle position, the tensioner is separated from the belt (no contact).

The tensioner is rotated in this predefined rotation direction (for example, counterclockwise direction) until it is in contact with the belt (point of contact).

One then continues to rotate the tensioner in this predefined rotation direction, generally using a tool. The belt then exerts a force on the tensioner, in reaction to the force applied by the tensioner thereon, which tends to push the tensioner back toward its idle position. This force therefore tends to rotate the tensioner in the direction opposite the predefined rotation direction (therefore in the clockwise direction if we use the same example).

One then continues to rotate the tensioner in the predefined rotation direction until reaching a tilting point.

Below this tilting point, the reaction force exerted by the belt increases and tends to return the tensioner toward its idle position, while still acting in the direction opposite the predefined rotation direction.

However, past this tilting point, the force exerted by the belt on the tensioner acts to rotate the tensioner in the predefined rotation direction (counterclockwise if we use the same example). Thus, past the tilting point, it is no longer necessary to exert a force to rotate the tensioner in the predefined rotation direction, since the assembly itself acts automatically to tilt the tensioner from the tilting position toward the operating position.

A stop is then provided to prevent the tensioner from rotating in the predefined rotation direction past its operating position. The stop therefore defines the operating position of the tensioner.

The tilting point is sometimes called a "toggle point". For this reason, this assembly is sometimes described as "over-toggling".

This type of assembly is particularly interesting because it makes it possible to place the tensioner in its operating position easily, with a tool (lever arm, for example) that can be actuated with one hand. Once the toggle point is reached, everything happens automatically, with no additional effort for the installer. It is especially used with the elastic belts, for which it is easier to reach the toggle point.

Such an assembly is for example proposed in document EP 1,317,635.

The plate of the tensioner is mounted here on the stationary support (engine block) by means of a fixed pivot axis. On this pivot axis, both the fastening of the tensioner on the stationary support and the pivot function allowing the tensioner to pivot relative to the stationary support are performed.

The articulation means is therefore complex.

Furthermore, in order to ensure that the assembly will be able to allow the passage of the tensioner past the toggle point, the pivot axis must be installed carefully on the stationary support, the tensioner defining, in its travel between its idle position and its operating position, an arc of circle.

This installation is not always easy, since it requires leaving space for the tensioner in its installation travel.

It is even sometimes impossible due to the local bulk, related to other design constraints relative to the engine block.

SUMMARY

In accordance with one or more aspects of the present disclosure, an assembly is provided, including:
  a stationary support, such as an engine block,
  a plurality of pulleys rotatably mounted on the support,
  a belt mounted on the pulleys,
  a tensioner including:
    a plate,
    a rotating element mounted on the plate by means of a rotation axis stationary relative to that plate,
    the tensioner being able to rotate relative to the support, in a predefined rotation direction, between an idle position in which the rotating element is moved away from the belt and an operating position in which the rotating element is in contact with the belt, having specified that, in the operating position, the belt exerts a force on the rotating element, the direction of that force tending to cause the tensioner to rotate in that same predefined rotation direction;
  means for preventing the tensioner from rotating in the predefined rotation direction past its operating position;
  wherein, in order to rotate the tensioner relative to the support between the idle position and the operating position of the tensioner, the assembly comprises:
    at least one closed aperture positioned on the plate of the tensioner or on the support;
    at least one means for cooperating with the or each closed aperture, this cooperating means being stationary relative to the support when the closed aperture is situated on the plate or stationary relative to the plate when the closed aperture is situated on the support.

This assembly may also have at least one of the following features, considered alone or in combination:
  the closed aperture has a shape arranged such that when the tensioner rotates relative to the support in its idle position and its operating position, the rotational movement performed by the tensioner is not circular;
  the closed aperture has one of the following shapes: V shape, shape including at least one curved part and one linear part, curved shape not defining an arc of circle, for example a spiral shape, shape including at least two curved parts, for example a tri-lobe form;
  the closed aperture has an arc of circle shape;
  the assembly provides at least two means for cooperating with the closed aperture, each cooperating means being stationary relative to the support when the closed aperture is situated on the plate or stationary relative to the plate when the closed aperture is situated on the support;

the assembly comprises at least two closed apertures positioned on the plate or on the support;

the two closed apertures are arranged such that when the tensioner rotates relative to the support between its idle position and its operating position, the rotational movement done by the tensioner is not circular;

the two closed apertures have different shapes, for example a curved shape for the first closed aperture and a straight shape for the second closed aperture;

the assembly provides at least one means for cooperating with each closed aperture, each cooperating means being stationary relative to the support when each closed aperture is situated on the plate or stationary relative to the plate when each closed aperture is situated on the support;

the means for preventing the tensioner from rotating in the predefined rotation direction past its operating position comprise a stop formed by an end of the or at least one of the closed aperture(s), which blocks any movement of the cooperating means with the closed aperture;

the assembly further comprises an open aperture positioned on the plate, the bottom of this open aperture then forming a stop able to cooperate with cooperating means for that open aperture, provided on the stationary support;

the assembly comprises at least one means for fixing the position of the plate of the tensioner relative to the support, when the tensioner is in the operating position;

the means for fixing this position comprises the, each, or depending on the case, at least one of the cooperating means with the or each closed aperture or the open aperture;

to fix this position, a fixing means is provided other than the cooperating means with the or each closed aperture or the open aperture, this fixing means for example crossing through the plate at the stationary rotation axis of the rotating element relative to the plate and being inserted in the support.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 shows, in partial front view, another embodiment of an assembly according to the disclosure;

FIGS. 3(*a*) to 3(*e*) show, in different front views, different alternatives of the assembly according to the disclosure;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
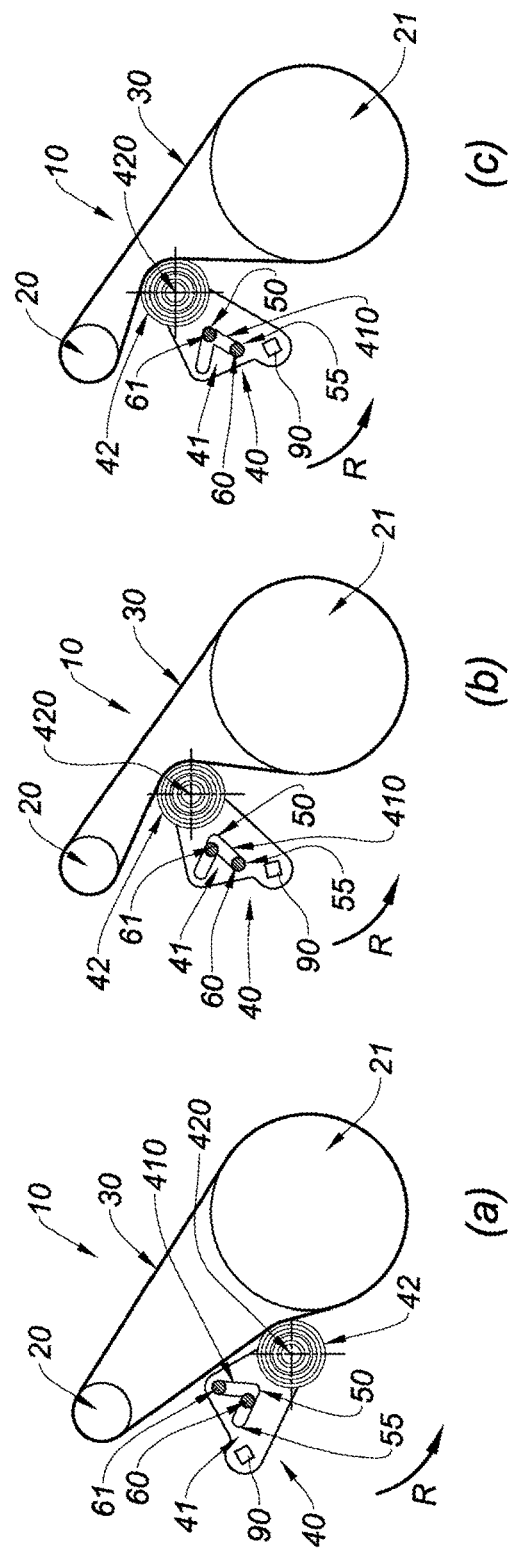
FIGS. 1(*a*), 1(*b*) and 1(*c*) show, in front views, an assembly including an engine block as stationary support, pulleys mounted rotating on the support, a belt mounted on the pulleys and a tensioner including a plate and a rotating element mounted on the plate about a rotation axis that is stationary relative to that plate, when the tensioner is placed in contact with the belt in FIG. 1(*a*): the tensioner is in the operating position in FIG. 1(*c*), and in an intermediate position in FIG. 1(*b*)

An assembly according to the disclosure is for example shown in FIGS. 1(*a*) to 1(*c*).

This assembly includes a stationary support 10 such as an engine block, a plurality of pulleys 20, 21 mounted rotating on the support 10 and a belt 30 mounted on the pulleys 20, 21.

The assembly also comprises a tensioner 40 for the belt 30 that includes a plate 41 and a rotating element 42 mounted on the plate 41 by means of a rotation axis 420 stationary relative to the plate 41.

The tensioner 40 is able to rotate relative to the support 10, in the rotation direction R, between the idle position in which the rotating element 42 is separated from the belt 30 and an operating position, in which the rotating element 42 is in contact with the belt 30.

In FIG. 1(*a*), the tensioner 40 is placed in contact with the belt 30 for the first time (intermediate position between the idle position and the operating position). In FIG. 1(*c*), the tensioner 40 is in the operating position. In FIG. 1(*b*), an intermediate position is shown between the position shown in FIG. 1(*a*) and the position shown in FIG. 1(*c*). The rotation direction of the tensioner 40 during the assembly, denoted R, is counterclockwise in this case.

It will be noted that the tensioner shown in FIGS. 1(*a*) to 1(*c*) corresponds to that which is shown, in the idle position, in FIG. 3(*a*).

In the context of the disclosure, the different elements of the assembly are positioned such that the belt 30 exerts, on the rotating element 42 and when the tensioner 40 is in the operating position, a force whose direction tends to cause the tensioner 40 to rotate in the same predefined rotation direction R (toggle point passed). On the contrary, in the position shown in FIG. 1(*a*), the toggle point is not passed, such that the belt 30 exerts, on the tensioner 40, a force whose direction tends to rotate the tensioner 40 in the direction opposite the predefined rotation direction R. Lastly, in the position shown in FIG. 1(b), the tensioner 40 is situated substantially at the toggle point.

Due to this operation, the assembly also provides at least one stop, in this case a stop 50 in FIGS. 1(a) to 1(c), to prevent the tensioner 40 from rotating in the rotation direction R past its operating point.

The stop 50 therefore defines the upper end position of the tensioner, by interacting in the case at hand with a means 61 assuming the form of a pin fixed on the engine block 10.

The assembly can operate normally.

However, for greater security, it is possible to consider providing at least one means for fixing the position of the plate 41 of the tensioner 40 relative to the engine block 10, when the tensioner 40 is in the operating position. This prevents any backward return of the tensioner 40, i.e., in the direction opposite the direction defined by the arrow R, which would for example be related to a jolt on the belt 30 while the engine is rotating. Different means for fixing the plate 41 on the engine block 10 will be described later.

In order to rotate the tensioner 40 relative to the engine block 10 between the idle position and the operating position of the tensioner, the assembly comprises a closed aperture 410 positioned on the plate 41 of the tensioner 40 as well as means 60, 61, in the case at hand, pins, for cooperating with the closed aperture 410, each cooperating means 60, 61 being stationary relative to the engine block 10.

From the idle position (not shown), it is the pin 61 that serves as rotation axis.

Then, the other pin 60 translates along a V-shaped arm of the closed aperture 410 (FIG. 1(a)) until reaching a stop 55 (FIG. 1(b)). At the same time, the pin 61 translates along the other arm of the V forming the closed aperture 410. Indeed, the pins 60, 61 being fixed on the support 10, the distance separating them remains constant throughout all of the mounting movement of the tensioner 40. This results in a rotation whereof the rotation axis is not a physical rotation axis and which, furthermore, changes all the time during this phase for mounting the tensioner 40 on the belt 30. Once the stop 55 is reached by the pin 60, we are substantially at the toggle point (FIG. 1(b)).

Lastly, after passing the toggle point, the pin 60 serves as a rotation axis and the pin 61 translates in the other arm of the V until reaching the stop 50, which defines the operating position.

A single closed aperture 410 can be provided on the plate 41 of the tensioner 40 or, depending on the case, on the stationary support 10, for example formed by the engine block. A single closed aperture 410 is for example provided on the plate 41 of the tensioner 40 in FIGS. 2, 3(a) to 3(e), 5 to 8.

In FIG. 2, the closed aperture 410 has an arc of circle shape. In FIG. 3(a), the closed aperture 410 is V-shaped. The V-shaped closed aperture can then have a constant width or have a first part with a first width and a second part with a second width, larger or smaller than the width of the first part. The V-shaped closed aperture 410 having parts with different widths is for example shown in FIGS. 1(a) to 1(c).

In FIG. 3(b), the closed aperture 410 has a first straight part and a second curved part that can for example be in the shape of an arc of circle. An alternative of FIG. 3(b) may consist of providing a first curved part and a second straight part. In FIG. 3(c), the closed aperture 410 has a spiral shape. In FIG. 3(d), the closed aperture 410 has a first curved part, for example in an arc of circle shape, a second straight part and a third curved part, for example in an arc of circle shape. In FIG. 3(e), the closed aperture 410 has an elliptical shape.

Figure 10B:
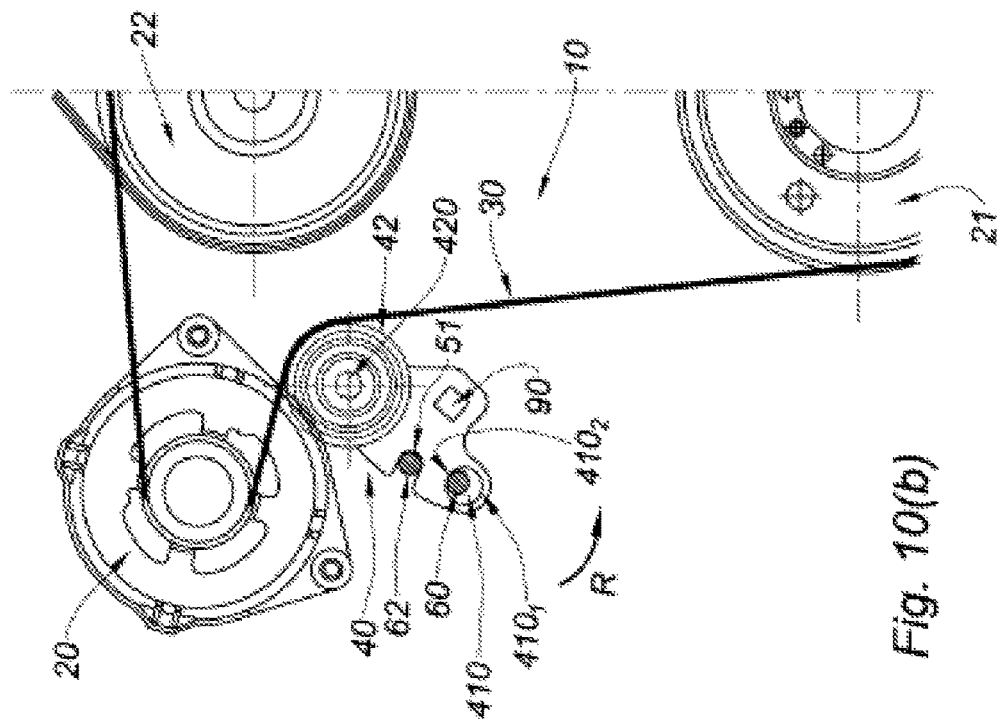
FIGS. 10(*a*) and 10(*b*) show, in front views, the tensioner shown in FIG. 3(*e*) when the latter is mounted on an engine block in this case including three pulleys through which the belt passes.
Figure 10A:
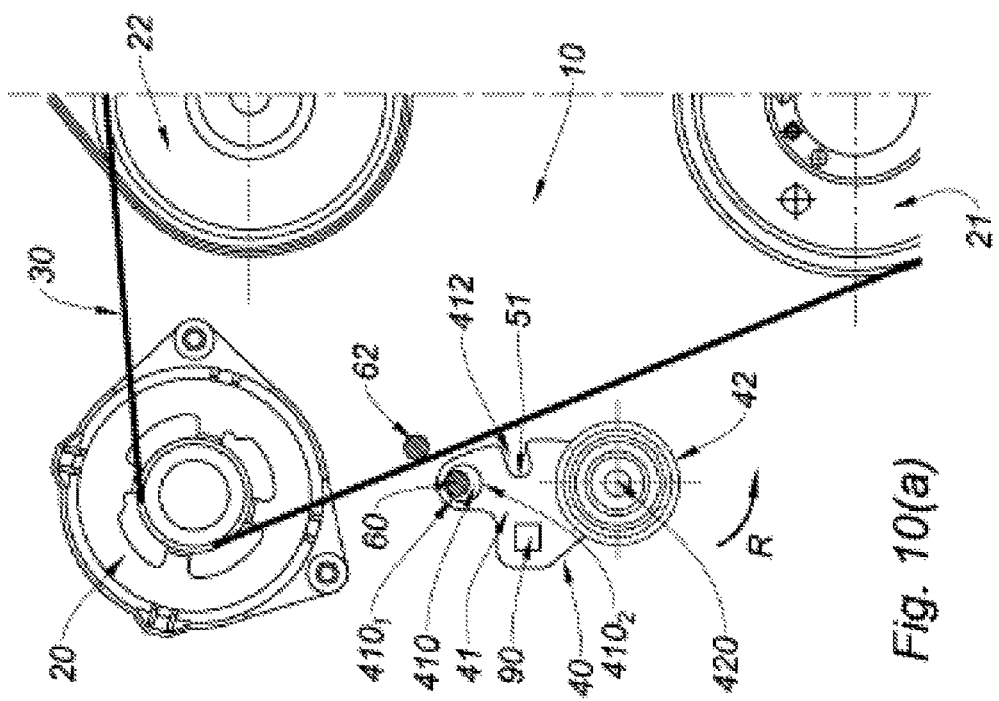

The tensioner of FIG. 3(e) is also shown in FIGS. 10(a) and 10(b) in its environment, i.e., an engine block on which three pulleys 21, 22, 23 are mounted that are passed through by the belt 30 on which the tensioner 40 is designed to act. In FIG. 10(a), the tensioner 40 is in the idle position, and in FIG. 10(b), the tensioner 40 is in the operating position, therefore past the toggle point.

In the idle position, the means 60, in this case the pin mounted stationary on the engine block 10, is situated against a first end of the closed aperture 410. In the operating position, this pin 60 is situated against the other end of the closed aperture 410 and furthermore, the bottom of the open aperture 412 forms a stop 51 abutting against a cooperating means 62 with the open aperture 412, this means 62 being mounted stationary on the engine block 10 and for example assuming the form of a pin.

Figures 5, 7:
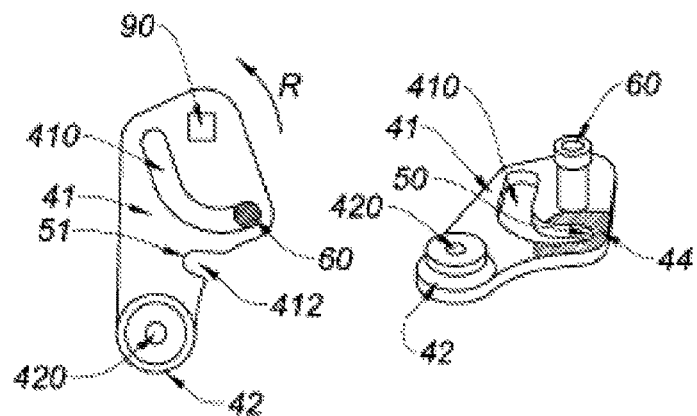
FIG. 5 shows an alternative of the assembly according to the disclosure that is partially shown in FIG. 3(*b*), for which alternative an open aperture is further provided.
FIG. 7 shows, in perspective view, an alternative of the assembly according to the disclosure that is partially shown in FIG. 3(*b*)
Figure 6:
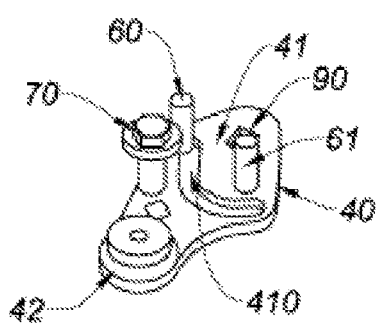
FIG. 6 shows, in perspective view, an alternative of the assembly according to the disclosure that is partially shown in FIG. 3(*b*)

The shape of the closed aperture 410 shown in FIG. 3(b) is copied in FIGS. 5 to 7.

Figure 8:
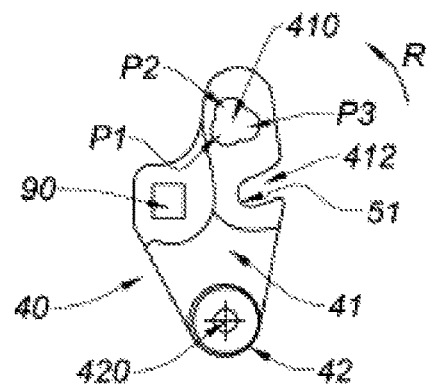
FIG. 8 shows, in front view, an alternative of the assembly according to the disclosure that is partially shown in FIG. 5.

FIG. 8 shows a closed aperture 410 with a tri-lobe shape.

Figure 4:
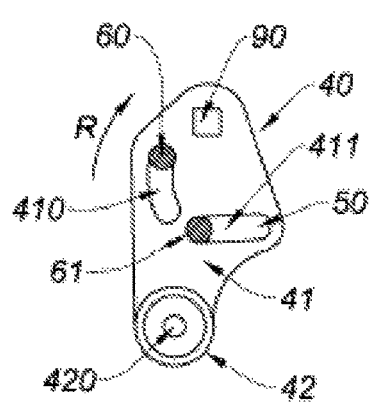
FIG. 4 shows a partial front view of another embodiment of an assembly according to the disclosure.

Several closed apertures 410, 411 can also be considered. This is for example the case in the alternative embodiments shown in FIG. 4 (closed apertures on the plate 41 of the tensioner 40) or FIG. 9 (closed apertures on the stationary support 10). It should be noted that the arrangement of the closed apertures 410, 411 proposed in FIG. 4 or 9 amounts to the form proposed as an alternative to that which is shown in FIG. 3(b), i.e., a first curved part and a second straight part.

To ensure the rotation of the tensioner 40 when it is assembled toward its operating position, it is possible to consider one or several cooperating means 60, 61 with the or each closed aperture 410, 411. For example, a cooperating means 60 is shown in FIG. 3(c), 3(d), 5 or 7. Two cooperating means 60, 61 are for example shown in FIGS. 2, 3(a), 3(b) and 6. It should, however, be noted that a single cooperating means could be provided with the closed aperture shapes 410 proposed in these FIGS. 2, 3(a), 3(b) and 6. Furthermore, it should be noted that two cooperating means of the type shown in FIGS. 2, 3(a), 3(b) and 6 could be considered for the embodiments shown in FIG. 3(c), 3(d), 5 or 7.

A single cooperating means 60 leaves greater freedom in the relative movement between the tensioner 40 and the stationary support 10, which could be advantageous in some cases due to the bulk related to the environment of the engine block. However, two cooperating means 60, 61 make it possible to ensure better guiding, which makes the assembly easier.

In FIG. 3(e), the elliptical shape of the closed aperture 410, for example not very extended, favors the use of a single cooperating means 60.

Likewise, for the tri-lobe shape shown in FIG. 8, the use of a single cooperating means (not shown, but corresponds to the means 60 shown in the other appended FIGURES) is more appropriate. In that case, the interaction between the first lobe and the cooperating means will advantageously correspond to the idle position of the tensioner 40 (position P1), the interaction between the second lobe and the cooperating means will advantageously correspond to the position of the first contact of the tensioner 40 with the belt (position P2; cf. also FIG. 1(a)) and lastly, the interaction between the third lobe and the cooperating means will advantageously correspond to the operating position of the tensioner 40.

When two closed apertures 410, 411 are provided (FIGS. 4; 9), it is natural to provide a cooperating means 60, 61 for each closed aperture 410, 411.

As was previously mentioned, it is advantageous, although not mandatory, to provide means for fixing the plate 41 of the tensioner 40 to the stationary support 10 (engine block, for example).

This can be done by ensuring that each or at least one of the cooperating means 60, 61 assumes the form of a screw, bolt or equivalent means that is then used not only for guiding with the closed aperture, but also for tightening.

Alternatively, and as for example shown in FIG. 7, it is possible to consider that the cooperating means is a simple pin and that the plate 41 provides a means 44 for thickening the plate at the end of the closed aperture 410 serving as a stop 50. The fixing is then done by jamming.

Also alternatively, the or each cooperating means 60, 61 with the corresponding closed aperture 410, 411 can be dedicated to this function alone.

Figure 9:
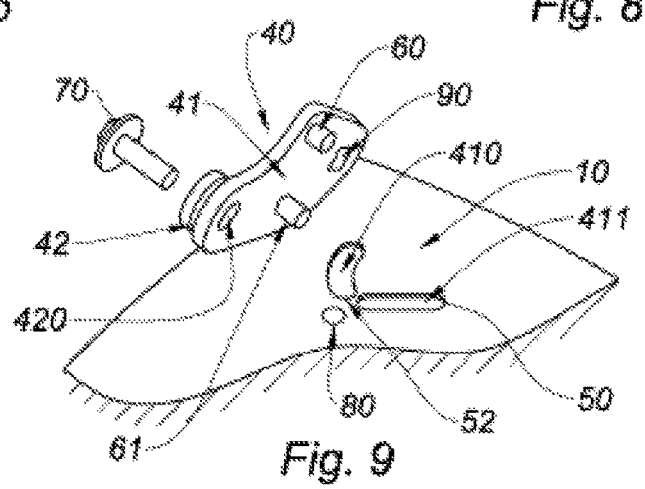
FIG. 9 shows, in perspective view, an alternative of the assembly according to the disclosure that is partially shown in FIG. 4.

In this case, it is necessary to provide a specific means 70 for ensuring tightening of the plate 41 to the stationary support 10. Such a means 70, in the case at hand a bolt, is for example proposed in FIGS. 6 and 9. In FIG. 6, the bolt 70 then crosses through the plate 41 and becomes inserted in an orifice (not shown) provided on the stationary support 10. In FIG. 9, the same situation exists, with the difference that the bolt 70 crosses through the plate 41 at the stationary rotation axis 420 of the rotating element 42 relative to the plate 41. It then becomes housed in an orifice 80 provided in the stationary support 10. In this case, the bolt 70 of course does not prevent the rotating element 42 from rotating relative to the plate 41 of the tensioner 40.

According to another alternative, one 61 of the cooperating means 60, 61 can be inserted into an open aperture 412 provided on the plate 41 of the tensioner 40. An open aperture 412 will advantageously be provided when the closed aperture 410 has a shape leaving great freedom of movement to the cooperating means 60. This is for example the case in FIGS. 3(*e*), 10(*a*) and 10(*b*), or this other cooperating means is a pin 61 fixed on the engine block 10 or in FIGS. 5 and 8 (in which the other cooperating means 61 is not shown).

For the assembly, the rotation direction R can be chosen to be clockwise or counterclockwise. This choice depends on the space constraints encountered on the engine block 10 and/or the installation mode of the tensioner, which can be placed in contact with the inner face of the belt 30 or the outer face of the belt 30. In FIGS. 1(*a*) and 1(*b*), the tensioner 40 is in this case in contact with the outer face of the belt 30.

It should be noted that the tensioner 40 generally provides for an orifice 90 allowing the insertion of an assembly tool (lever arm) facilitating the assembly of the tensioner 40 on the belt 30.

Irrespective of the alternatives of the disclosure, the articulation between the tensioner 40 and the stationary support 10 (engine block, for example) is done simply by providing a closed aperture and means for cooperating with that closed aperture.

Furthermore, for all of the described embodiments, with the exception of that of FIG. 2 when two cooperating means 60, 61 are provided, the movement done by the tensioner between its idle position and its operating position is not an arc of circle. It is therefore possible to provide a much freer movement that makes it possible to do away with certain bulk constraints related to the environment of the stationary support/engine block.

This freedom is even further increased when a single cooperating means 60 is provided with the closed aperture 410.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An assembly, comprising:
   a stationary support;
   a plurality of pulleys rotatably mounted on the support;
   a belt mounted on said pulleys;
   a tensioner, including:
      a plate,
      a rotating element mounted on the plate about a rotation axis stationary relative to said plate,
   the tensioner being able to rotate relative to the support, in a predefined rotation direction, between an idle position in which the rotating element is moved away from the belt and an operating position in which the rotating element is in contact with the belt, wherein in the operating position, the belt exerts a force on the rotating element, the direction of that force tending to cause the tensioner to rotate in that same predefined rotation direction;
   means for preventing the tensioner from rotating in the predefined rotation direction past its operating position;
   wherein in order to rotate the tensioner relative to the support between the idle position and the operating position of the tensioner, the assembly comprises:
   at least one closed aperture positioned on the plate of the tensioner or on the support, wherein the at least one closed aperture having a shape arranged such that when the tensioner rotates relative to the support in its idle position and its operating position, the rotational movement performed by the tensioner is not circular;
   at least one means for cooperating with the at least one closed aperture, said cooperating means being stationary relative to the support when the at least one closed aperture is situated on the plate or stationary relative to the plate when the at least one closed aperture is situated on the support.

2. The assembly according to claim 1, further comprising at least two means for cooperating with the at least one closed aperture, each cooperating means being stationary relative to the support when the closed aperture is situated on the plate or stationary relative to the plate when the closed aperture is situated on the support.

3. The assembly according to claim 1, wherein the at least one closed aperture includes two closed apertures positioned on the plate or on the support.

4. The assembly according to claim 3, wherein the two closed apertures are arranged such that when the tensioner rotates relative to the support between its idle position and its operating position, the rotational movement done by the tensioner is not circular.

5. The assembly according to claim 3, wherein the two closed apertures have different shapes.

6. The assembly according to claim 1, further comprising at least one means for cooperating with each of the at least one closed aperture, each cooperating means being stationary relative to the support when each closed aperture is situated on the plate or stationary relative to the plate when each closed aperture is situated on the support.

7. The assembly according to claim 1, wherein the means for preventing the tensioner from rotating in the predefined rotation direction past its operating position comprise a stop formed by an end of the or at least one of the closed aperture(s), which blocks any movement of the cooperating means with the closed aperture.

8. The assembly according to claim 1, further comprising at least one means for fixing the position of the plate of the tensioner relative to the support, when the tensioner is in the operating position.

9. The assembly according to claim 8, wherein the at least one means for fixing comprises at least one of the at least one cooperating means.

10. The assembly according to claim 8, wherein to fix the position of the plate, the at least one means for fixing is provided other than the at least one cooperating means, the at least one means for fixing crossing through the plate at the stationary rotation axis of the rotating element relative to the plate and being inserted in the support.

11. An assembly, comprising:
a stationary support;
a plurality of pulleys rotatably mounted on the support;
a belt mounted on said pulleys;
a tensioner, including:
 a plate,
 a rotating element mounted on the plate about a rotation axis stationary relative to said plate,
the tensioner being able to rotate relative to the support, in a predefined rotation direction, between an idle position in which the rotating element is moved away from the belt and an operating position in which the rotating element is in contact with the belt, wherein in the operating position, the belt exerts a force on the rotating element, the direction of that force tending to cause the tensioner to rotate in that same predefined rotation direction;
means for preventing the tensioner from rotating in the predefined rotation direction past its operating position;
wherein in order to rotate the tensioner relative to the support between the idle position and the operating position of the tensioner, the assembly comprises:
at least one closed aperture positioned on the plate of the tensioner or on the support;
at least one means for cooperating with the or each closed aperture, said cooperating means being stationary relative to the support when the closed aperture is situated on the plate or stationary relative to the plate when the closed aperture is situated on the support,
wherein the at least one closed aperture has one of the following shapes: V shape, a shape including at least one curved part and one linear part, a curved shape not defining an arc of circle, a spiral shape, a shape including at least two curved parts, and a tri-lobe form.

12. An assembly, comprising:
a stationary support;
a plurality of pulleys rotatably mounted on the support;
a belt mounted on said pulleys;
a tensioner, including:
 a plate,
 a rotating element mounted on the plate about a rotation axis stationary relative to said plate,
the tensioner being able to rotate relative to the support, in a predefined rotation direction, between an idle position in which the rotating element is moved away from the belt and an operating position in which the rotating element is in contact with the belt, wherein in the operating position, the belt exerts a force on the rotating element, the direction of that force tending to cause the tensioner to rotate in that same predefined rotation direction;
means for preventing the tensioner from rotating in the predefined rotation direction past its operating position;
wherein in order to rotate the tensioner relative to the support between the idle position and the operating position of the tensioner, the assembly comprises:
at least one closed aperture positioned on the plate of the tensioner or on the support;
at least one means for cooperating with the or each closed aperture, said cooperating means being stationary relative to the support when the closed aperture is situated on the plate or stationary relative to the plate when the closed aperture is situated on the support;
wherein an open aperture is positioned on the plate, the bottom of the open aperture then forming a stop able to cooperate with cooperating means for that open aperture, provided on the stationary support.

* * * * *